March 29, 1955  E. G. FORSSELL  2,705,077
COMBINED FRICTION AND RUBBER SHOCK ABSORBING
MECHANISMS FOR RAILWAY DRAFT RIGGINGS
Filed March 25, 1953  2 Sheets-Sheet 1

Inventor:
Eric G. Forssell.

March 29, 1955 E. G. FORSSELL 2,705,077
COMBINED FRICTION AND RUBBER SHOCK ABSORBING
MECHANISMS FOR RAILWAY DRAFT RIGGINGS
Filed March 25, 1953 2 Sheets-Sheet 2
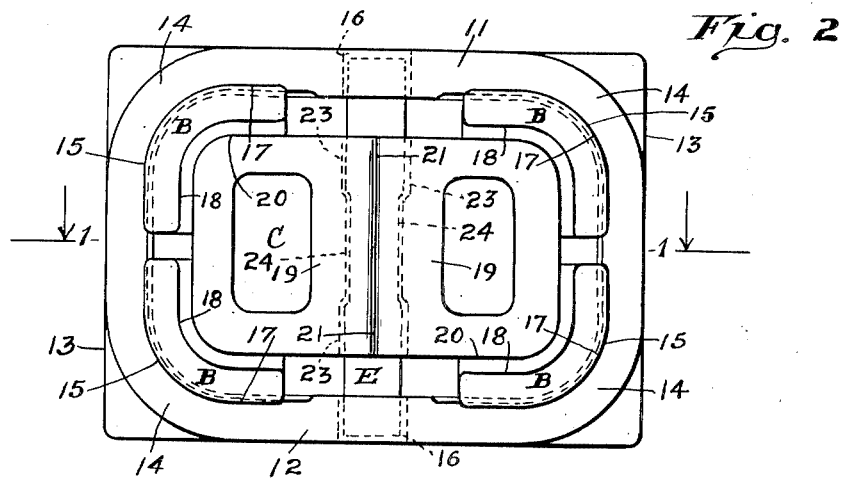
Fig. 2
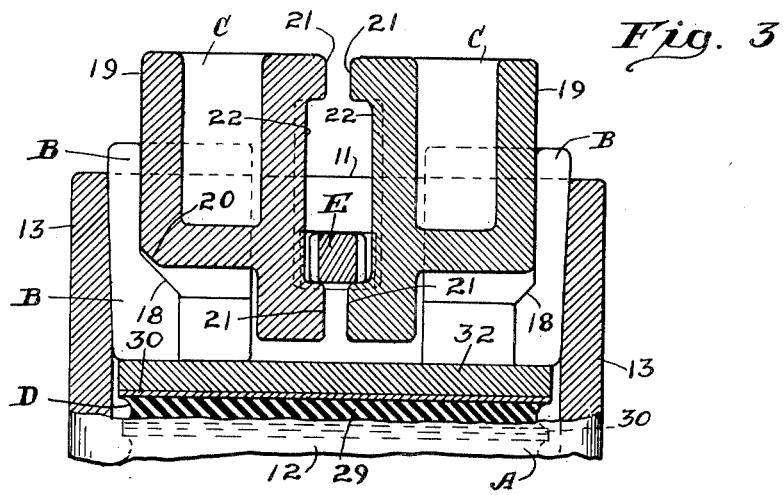
Fig. 3
Fig. 4
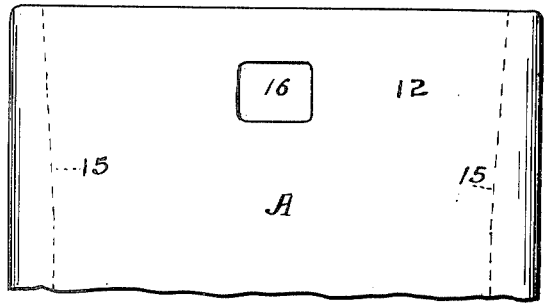
Inventor:
Eric G. Forssell.
By Henry Fuchs
Atty.

United States Patent Office 2,705,077
Patented Mar. 29, 1955

2,705,077

COMBINED FRICTION AND RUBBER SHOCK ABSORBING MECHANISMS FOR RAILWAY DRAFT RIGGINGS

Eric G. Forssell, Kenmore, N. Y., assignor to W. H. Miner, Inc., Chicago, Ill., a corporation of Delaware Application March 25, 1953, Serial No. 344,534

3 Claims. (Cl. 213—32)

This invention relates to improvements in combined friction and rubber shock absorbing mechanisms for railway draft riggings.

One object of the invention is to provide a friction shock absorbing mechanism comprising a friction casing, friction shoes slidingly telescoped within the casing, a cushioning element under initial compression, within the casing, yieldingly opposing inward movement of the shoes, a wedge engaging the shoes for spreading the same apart, and a key connecting the wedge to the casing for limited movement with respect to the latter and holding the parts of the mechanism assembled, wherein the wedge is split lengthwise to provide two sections embracing the key from opposite sides and having shouldered engagement therewith for holding the key against endwise removal, the sections of said wedge being held contracted in interlocked relation with the key by the wedging action between the shoes and said wedge, induced by the yielding pressure exerted on the shoes by the compressed cushioning element.

A more specific object of the invention is to provide a mechanism as set forth in the preceding paragraph, wherein the sections of the wedge have slots through which the key is engaged, the slots being elongated in direction lengthwise of the mechanism, to permit relative lengthwise movement of the wedge with respect to the casing, to the desired extent during the compression of the mechanism.

Other objects of the invention will more clearly appear from the description and claims hereinafter following.

In the accompanying drawings forming a part of this specification,

Figure 2 is a front elevational view of Figure 1, looking from left to right in said figure.

Figure 3 is a broken view, similar to Figure 1, showing the front end of the mechanism only and illustrating the manner of assembling the same.

Figure 4 is a top plan view, broken away, of Figure 2.

Figure 5 is a side elevational view of one of the sections of the wedge shown in Figure 1, looking upwardly in Figure 6.

Figure 6 is a transverse sectional view, corresponding substantially to the line 6—6 of Figure 5.

Figure 7 is a side elevational view of the retaining key of my improved mechanism.

Figure 1:
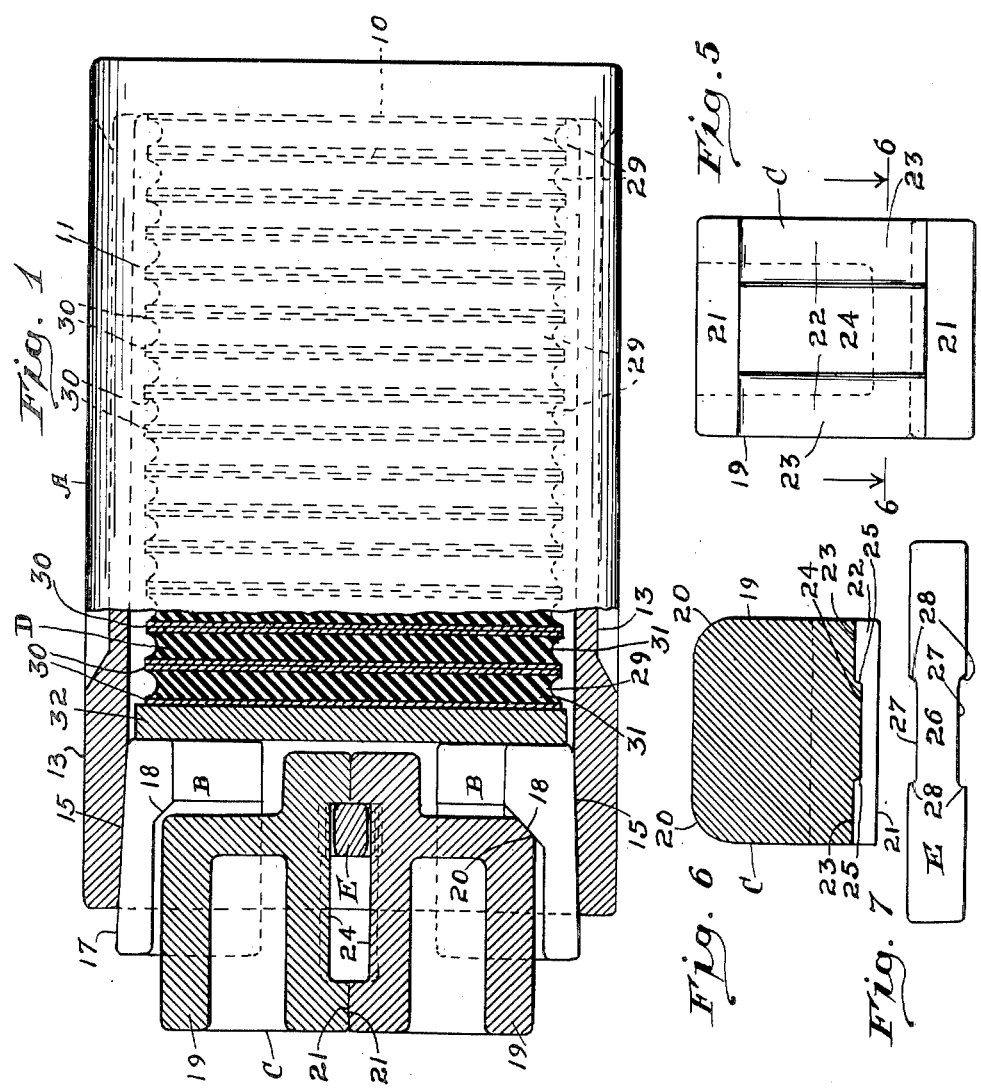
Figure 1 is a part plan and part horizontal, longitudinal sectional view of my improved friction shock absorbing mechanism, corresponding substantially to the line 1—1 of Figure 2.

As illustrated in the drawings, my improved shock absorbing mechanism comprises broadly a casing A, a set of four friction shoes B—B—B—B, a two-part sectional wedge C, a rubber cushioning element D within the casing, and a retaining key E.

The casing A is in the form of a rectangular box-like member, open at its front end and closed by a transverse vertical wall 10 at its rear end. The casing A has lengthwise extending, horizontally disposed, top and bottom walls 11 and 12, and lengthwise extending, vertical side walls 13—13. At the forward or open end thereof, the corners of the casing are rounded off, thus providing curved walls 14—14—14—14, connecting the top, bottom and side walls 11—12—13—13. These rounded corner portions, together with the adjacent straight wall portions of the casing, provide four interior friction surfaces 15—15—15—15, which are located at the four corners of the casing. These friction surfaces converge inwardly of the casing, thus providing a tapered friction shell section.

The top and bottom walls 11 and 12 of the casing are provided with vertically aligned, rectangular openings 16—16 for holding the key E.

The friction shoes B, which are four in number, are arranged within the casing A in sliding engagement with the friction surfaces 15—15—15—15, one shoe being disposed in each corner thereof and having a friction surface 17 on the outer side thereof which corresponds in cross section to the cooperating friction surface 15 of the casing.

On the inner side, each shoe has a wedge face 18 of substantially V-shaped, transverse cross section, which is inclined inwardly toward the longitudinal central axis of the mechanism.

The wedge C is split lengthwise, thus providing two sections 19—19, which are located at opposite sides of the central longitudinal axis of the casing A. Each section 19 of the wedge C presents two wedge faces 20—20 at the outer side thereof, which are located, respectively, at the top and bottom corners of the same and engaged with the wedge faces 18—18 of the shoes B—B at the corresponding side of the casing, the wedge faces 20—20 being correspondingly inclined to the wedge faces 18—18. Each face 20 of each section 19 extends in opposite directions from the corresponding corner thereof along the corresponding sides of the section to provide surfaces at substantially right angles to each other, which together form a wedge face of V-shaped transverse cross section. On the inner sides thereof, the two sections of the wedge C present substantially flat, lengthwise extending, vertically disposed, opposed faces 21—21, which are cut out to provide vertically extending, longitudinally elongated slots 22—22. The slot of each section 19 of the wedge C has the inner or back wall 23 thereof provided with a centrally disposed, relatively wide, outstanding rib 24, which extends lengthwise of the section 19 from the front to the rear end of the slot 22 providing shoulders 25—25. The ribs 24—24 of the two sections 19—19 are in transverse alignment, that is, they are directly opposed to each other.

The key E is in the form of an elongated rectangular bar. This bar is of reduced thickness between its ends, as indicated at 26, to provide recesses 27—27 at opposite sides thereof, presenting transverse stop shoulders 28—28. The key E extends through the wedge C between the sections 19—19 thereof, and has its opposite ends seated in the openings 16—16 of the casing. The central portion of the key E is embraced by the sections 19—19 of the wedge C, the same being engaged through the slots 22—22 of these sections, with the ribs 24—24 engaged within the recesses 27—27 of said key, thus holding the key against endwise displacement with respect to the wedge, the cooperating shoulders 25—25 and 28—28 being engaged with each other.

The cushioning element D comprises a plurality of rubber units 29—29 arranged in series, each unit being composed of a pair of metal plates 30—30 and an interposed rubber pad 31, which is vulcanized to the plates. The cushioning element D is disposed within the casing A in back of the shoes B—B—B—B, a rectangular follower plate 32 being interposed between the shoes and the front end of said element. The rear end of the element D bears on the back wall of the casing A.

The cushioning element D is under initial compression in the assembled condition of the mechanism and presses the shoes B—B—B—B against the sectional wedge C to hold the latter contracted to connect the key thereto and hold the same against endwise removal from said sections 19—19 while permitting lengthwise movement of the split wedge C with respect to the key. The slots 22—22 of the sections 19—19 of the split wedge C are of such a length that inward movement of the split wedge C is permitted to an extent to allow unrestricted full compression of the mechanism. The parts are preferably proportioned so that full compression of the mechanism is reached when the usual front follower, not shown, of the rigging is stopped by engagement with the front end of the casing A and the outer end of the wedge C lies flush with the outer end of the casing A.

In assembling the mechanism, the cushioning element D, follower plate 32, shoes B—B—B—B, and the sectional wedge C are placed within the casing, while the latter is stood on end in upright position, the follower plate being interposed between the lower ends of the shoes and the cushioning element D, and the split wedge C resting loosely on the shoes. The shoes B—B—B—B are then forced downwardly against the resistance of the cushioning element D until the parts reach the position shown in Figure 3. In this position, the sections 19—19 of the wedge C are relieved from the wedging pressure of the shoes and may be spread apart a sufficient distance to permit the thicker portion of the key E to pass into and through the slots 22—22 of the sections 19—19. While the parts are held in this position, the key E is entered between the sections 19—19 by inserting the same endwise through one of the openings 16 of the casing. After the key has been brought to position, with the recesses 27—27 thereof aligned with the ribs 24—24 of the sections 19—19, the pressure is removed from the shoes B—B—B—B, permitting the latter to be projected by the rubber cushioning element D, against the split wedge C to contract the sections 19—19 and engage the ribs 24—24 within the recesses 27—27 of the key, thus securing the key against accidental removal.

I claim:

1. In a friction shock absorbing mechanism, the combination with a casing; of friction shoes slidingly telescoped within the casing; a two-part split wedge in wedging engagement with said shoes said wedge parts being provided with elongated key receiving slots extending lengthwise of the casing; a yielding cushioning element within the casing, under initial compression, pressing against said shoes to wedge the latter against said parts of said wedge and hold the latter contracted; and a key connecting the wedge to the casing, embraced between said parts of the wedge, and having its opposite ends fixed to the casing, said parts of the wedge and key having one set of cooperating stop shoulders limiting movement outwardly of the casing, and a second set of cooperating shoulders at the end of said slot holding said key against endwise displacement with respect to said wedge.

2. In a friction shock absorbing mechanism, the combination with a casing; of friction shoes slidingly telescoped within the casing; a two-part split wedge in wedging engagement with said shoes said wedge parts being provided with elongated key receiving slots extending lengthwise of the casing; a yielding cushioning element within the casing, under initial compression, pressing against said shoes to wedge the latter against said parts of said wedge and hold the latter contracted; and a key connecting the wedge to the casing, embraced in said slot between said parts of the wedge, said key having its opposite ends fixed to the casing, said key being reduced in thickness between its ends, and said parts of said wedge having projections interengaged with said reduced portion of the key for locking the key against endwise displacement, said parts of the wedge having shoulders thereon engaged with said key for limiting outward movement of said wedge.

3. In a friction shock absorbing mechanism, the combination with a casing having opposed walls, said walls being provided with aligned key receiving openings; of friction shoes slidingly telescoped within the casing; a two-part split wedge in wedging engagement with the shoes, said parts abutting each other on their inner sides; a key having its opposite ends fixed in the key receiving openings of said casing, said key extending between said parts of the wedge, the portion of said key which is disposed between said wedge parts being of reduced thickness at its central portion, thereby providing recesses at opposite sides of said key, said parts of the wedge having elongated slots on their abutting sides through which the reduced portion of the key extends, said slots having locking ribs therein extending lengthwise of the wedge and engaged in said recesses of the key to hold said key against endwise displacement, said slots of said wedge parts being elongated in direction lengthwise of the mechanism to allow relative lengthwise movement of the wedge with respect to said key; and a yielding element within the casing pressing against said shoes to wedge the latter against said parts of the wedge and clamp said parts together about said key.

References Cited in the file of this patent

UNITED STATES PATENTS

| | | |
|---|---|---|
| 1,941,787 | Clark | Jan. 2, 1934 |
| 2,466,932 | Dath | Apr. 12, 1949 |
| 2,492,525 | Dath | Dec. 27, 1949 |
| 2,644,684 | Spence et al. | July 7, 1953 |